(12) United States Patent
Chen

(10) Patent No.: US 6,375,288 B1
(45) Date of Patent: Apr. 23, 2002

(54) COMPUTER ENCLOSURE WITH DRIVE BRACKET

(75) Inventor: Yun Long Chen, Chung-Ho (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/746,526

(22) Filed: Dec. 21, 2000

(30) Foreign Application Priority Data

Sep. 21, 2000 (TW) .......................................... 89216364

(51) Int. Cl.[7] .............................................. A47B 97/00
(52) U.S. Cl. .................................................. 312/223.2
(58) Field of Search .......................... 312/223.1, 223.2, 312/257.1, 263, 265.1, 265.2, 265, 3, 265.4, 265.5, 265.6; 211/26; 361/683, 685, 724, 725, 726, 727

(56) References Cited

U.S. PATENT DOCUMENTS

| | | | | |
|---|---|---|---|---|
| 5,590,938 A | * | 1/1997 | De Andrea | 312/257.1 |
| 5,751,545 A | * | 5/1998 | Jung | 312/223.2 X |
| 6,246,580 B1 | * | 6/2001 | Weng | 312/223.2 X |

* cited by examiner

Primary Examiner—James O. Hansen
(74) Attorney, Agent, or Firm—Wei Te Chung

(57) ABSTRACT

A computer enclosure (2) includes a cage (10) and a drive bracket (50). The cage includes a first panel (14) and a second panel (16). Each panel defines an opening (20, 30). A pair of clasps (22, 32) and a dome (24, 34) is formed on each side of each opening. A recess (26, 36) and a bore (28, 38) is formed in each panel. The drive bracket has a base (52) and opposite side walls (54). Both ends of each side wall extend outwardly to form bent plates (56, 76). Each bent plate defines a pair of apertures (58, 78) and a hole (62, 82) for respectively engaging with the clasps and the dome. A pair of fixing tabs (66, 86) each with a dimple (68, 88) depends from respective opposite ends of the base. The fixing tabs and the dimples engage with the recesses and bores respectively.

17 Claims, 4 Drawing Sheets

COMPUTER ENCLOSURE WITH DRIVE BRACKET

BACKGROUND OF THE INVENTION

1. Field of the Invention

The present invention relates to a computer enclosure, and in particular to a computer enclosure which facilitates the installation of a drive bracket therein.

2. Related Art

When a conventional computer is assembled, a drive bracket is first mounted in a computer enclosure. Then data storage devices such as a hard disk drive (HDD), a floppy disk drive (FDD) and a compact disk read only memory (CD-ROM) drive are attached to the drive bracket. Users and manufacturers want to install a drive bracket into an enclosure easily. A drive bracket is typically secured to a computer enclosure by riveting or using a plurality of screws. However, such means are cumbersome and time-consuming. Extra components such as rivets or screws increase costs. Furthermore, during assembly, extra operating space for manipulating the rivets or screws is required.

Thus an improved computer enclosure is desired.

SUMMARY OF THE INVENTION

Accordingly, an object of the present of invention is to provide a computer enclosure which readily receives a drive bracket.

Another object of the present invention is to provide a computer enclosure which does not require extra fixing components.

To achieve the above-mentioned objects, a computer enclosure includes a cage and a drive bracket. The cage includes a first panel, a second panel, and a bottom panel. An upper portion of each of the first and second panels defines an opening. A pair of clasps and a dome is formed on each side of each opening. A recess with a communicating bore is defined in each of the first and second panels, at a lower edge of the opening. The drive bracket has a base and opposite side walls. Bent plates are formed at both ends of each side wall. Each bent plate defines a pair of apertures and a hole for respectively engaging with the corresponding clasps and dome of the cage. A fixing tab depends from each opposite end of the base. A dimple is formed in a center of each fixing tab. The fixing tabs and dimples engage with the recesses and bores of the cage respectively.

Other objects, advantages and novel features of the present invention will be drawn from the following preferred embodiment with attached drawings, in which:

DESCRIPTION OF THE PREFERRED EMBODIMENTS

Figure 1:
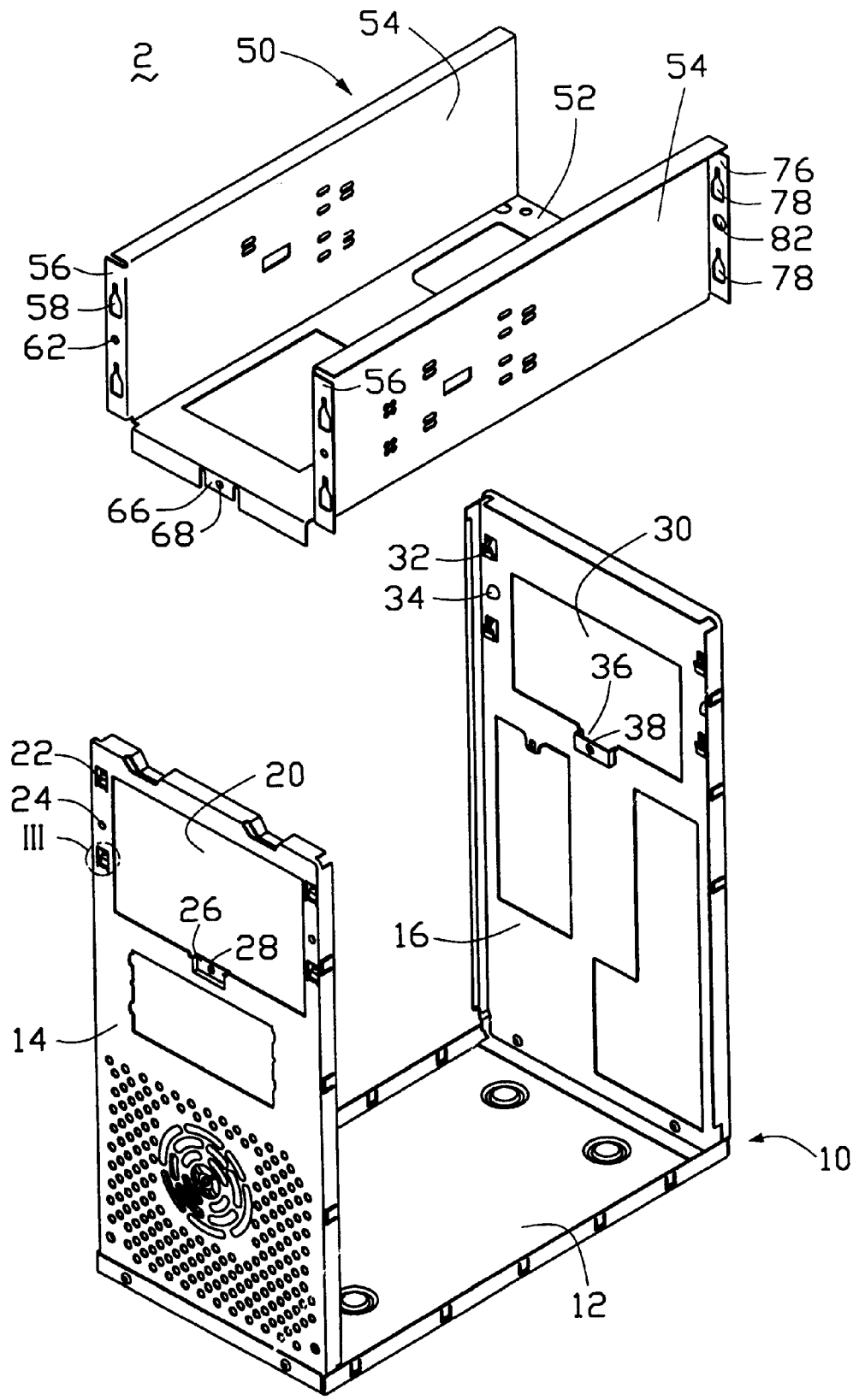
FIG. 1 is an exploded view of a computer enclosure with a drive bracket in accordance with the present invention.

Referring to FIG. 1, a computer enclosure 2 in accordance with a preferred embodiment of the present invention includes a cage 10 and a drive bracket 50. The cage 10 includes a first panel 14, a second panel 16, and a bottom panel 12.

Figure 3:
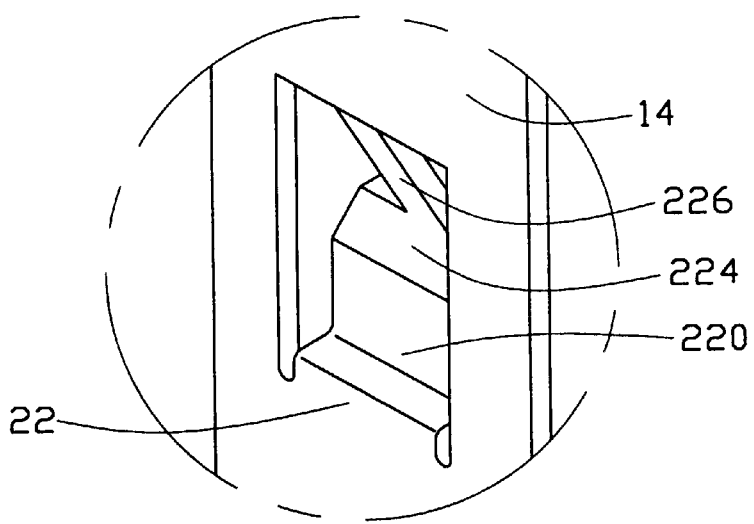
FIG. 3 is an enlarged view of the encircled portion III of FIG. 1.

An upper portion of the first panel 14 defines a first opening 20. A pair of first clasps 22 is inwardly formed in the first panel 14 on each side of the first opening 20. Referring also to FIG. 3, each first clasp 22 extends horizontally and then upwardly to form an L-shaped tab 220. A slanted portion 224 extends inwardly and upwardly from the L-shaped tab 220. A pole 226 extends from a middle portion of an upper end of the slanted portion 224 to an inner surface of the first panel 14 at an upper extremity of the first clasp 22. A first dome 24 is formed in the first panel 14 between each pair of first clasps 22. A convex surface of each first dome 24 faces inwardly, and a corresponding depression of each first dome 24 faces outwardly. A portion of the first panel 14 adjacent a lower edge of the first opening 20 is stamped inwardly to form a first rectangular recess 26. A first bore 28 is defined in the first panel 14 adjacent and in communication with the first recess 26.

Figure 2:
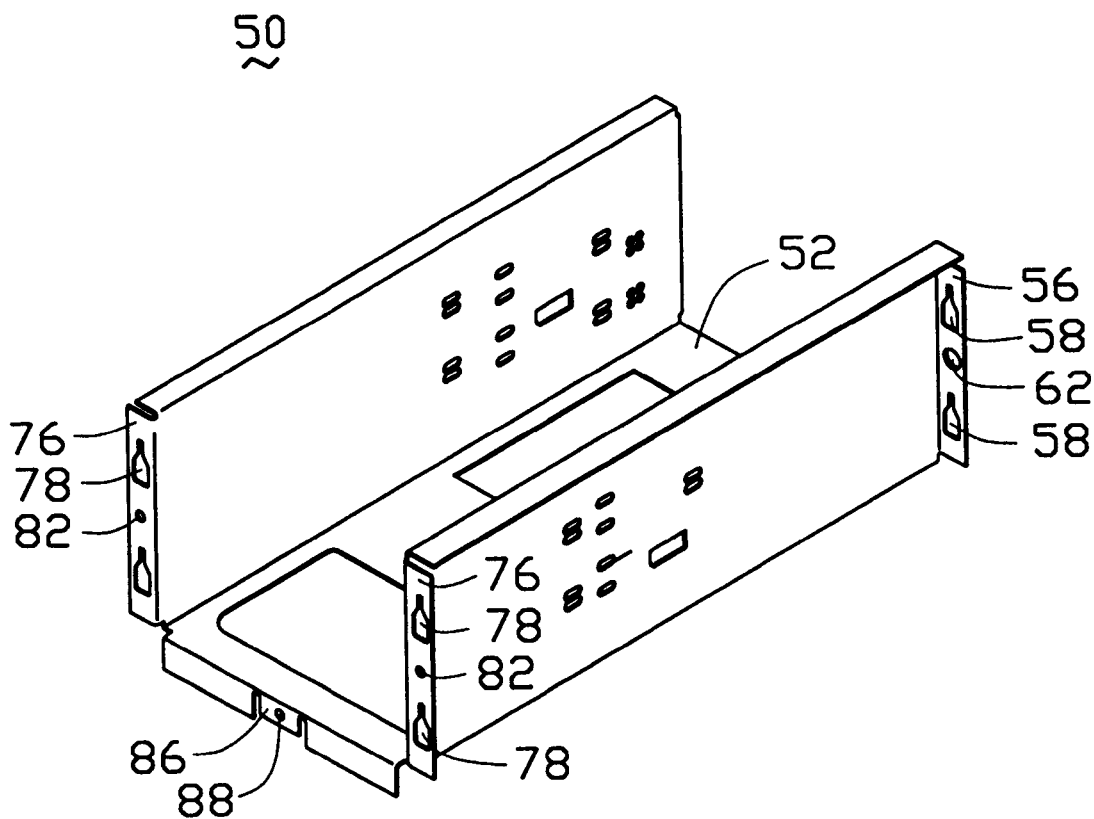
FIG. 2 is a perspective view of the drive bracket of FIG. 1, but from a different aspect.

Referring also to FIG. 2, an upper portion of the second panel 16 is substantially a mirror image of the upper portion of the first panel 14. The rear panel 16 defines a second opening 30 corresponding to the first opening 20 of the first panel 14. The rear panel 16 has two pairs of second clasps 22, two second domes 24, a second recess 26, and a second bore 28.

The drive bracket 50 includes a base 52 and two side walls 54 extending perpendicularly from opposite longitudinal sides of the base 50, together defining a space (not labeled) therebetween for receiving disk drives (not shown). One end of the drive bracket 50 is configured as follows: A pair of first bent plates 56 extends perpendicularly outwardly from respective ends of the side walls 54. A pair of first apertures 58 is defined in each first bent plate 56, corresponding to the first clasps 22 of the cage 10. A first hole 62 is defined in each first bent plate 56 between the first apertures 58, corresponding to the first dome 24 of the cage 10. Each first aperture 58 includes a lower wide portion 582, an upper narrow portion 584, and a central tapered portion 586 between the wide portion 582 and the narrow portion 584 (see FIG. 5). A first fixing tab 66 depends from a center section of the end of the base 52. A first dimple 68 is formed in the first fixing tab 66, corresponding to the first bore 28 of the first recess 26 of the cage 10. The other end of the drive bracket 50 is substantially a mirror image of the end of the drive bracket 50 described above. The other end of the drive bracket 50 comprises a pair of second bent plates 76, a pair of second apertures 78 defined in each second bent plate 76, a second hole 82 defined in each second bent plate 76 between the second apertures 78, a second fixing tab 86 depending from a center section of the end of the base 52, and a second dimple 88 formed in the second fixing tab 86.

Figure 4:
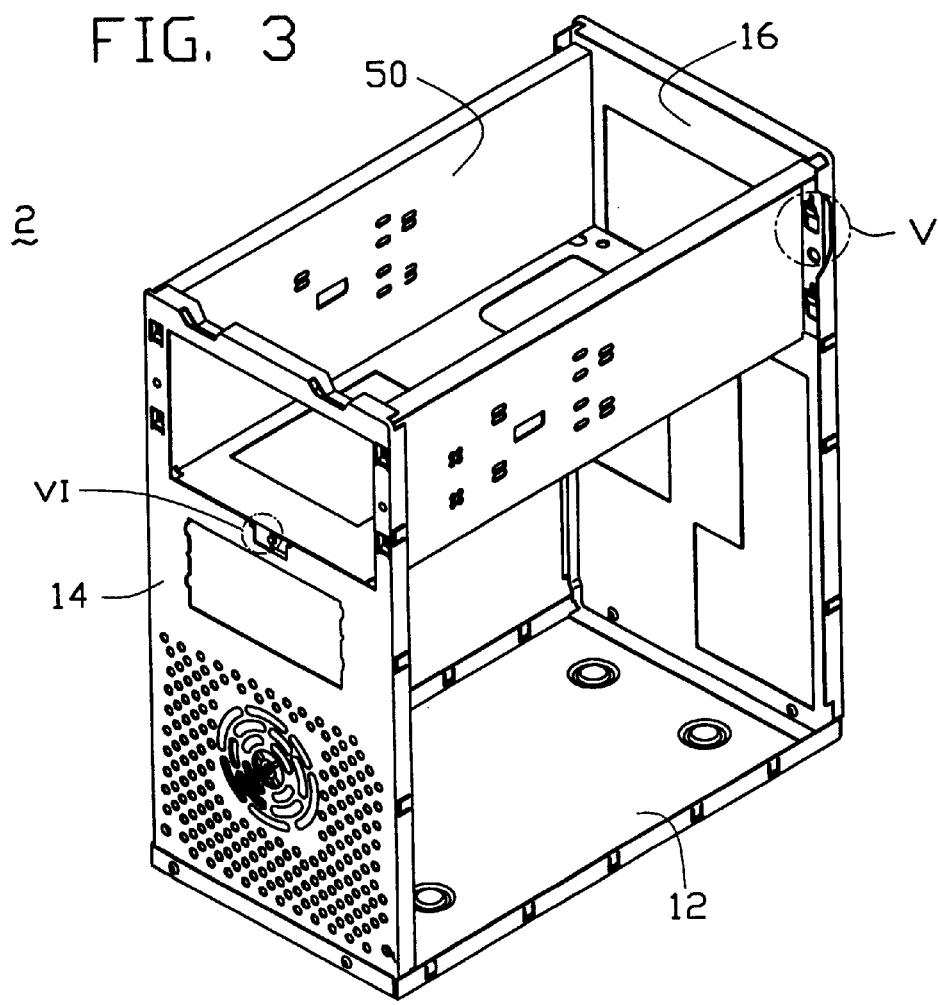
FIG. 4 is an assembled view of FIG. 1.
Figure 5:
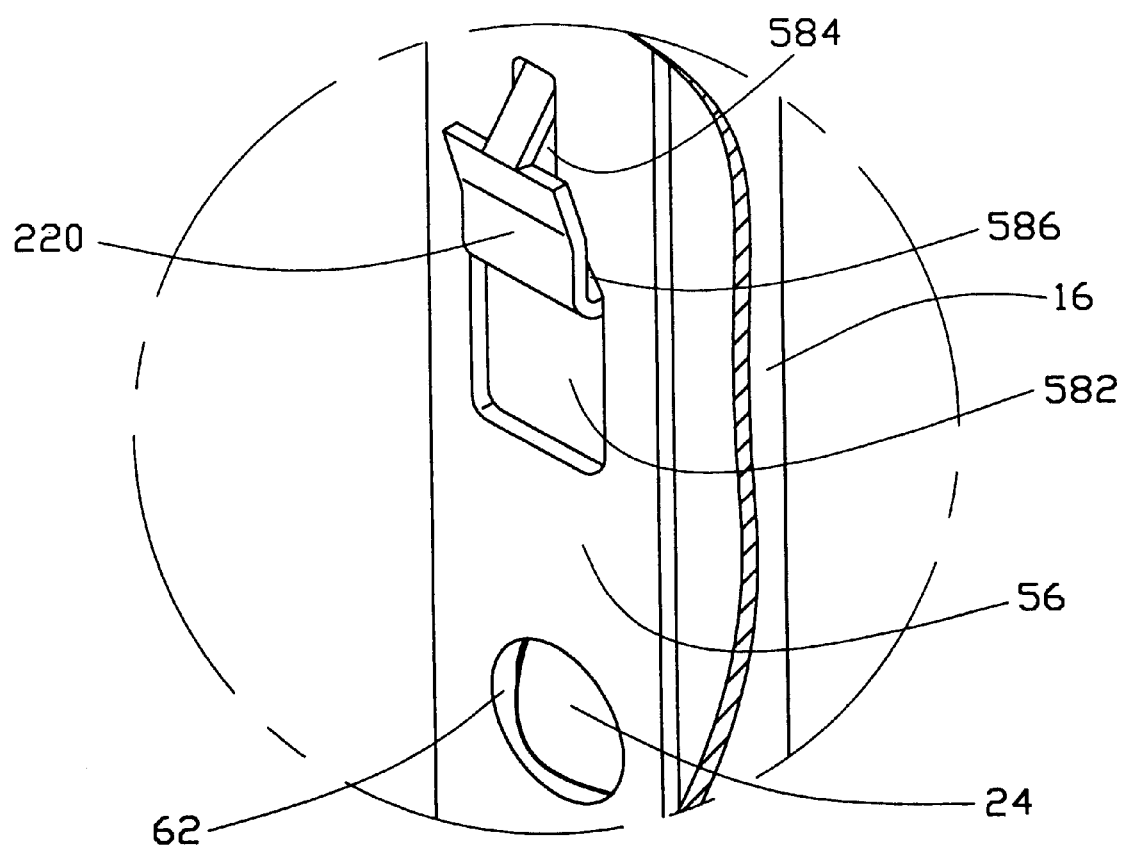
FIG. 5 is an enlarged view of the encircled portion V of FIG. 4.
Figure 6:
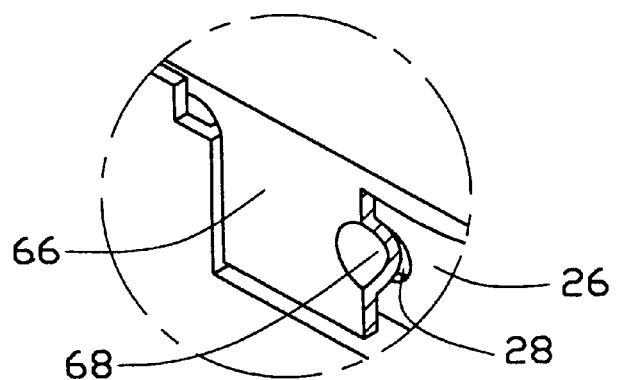
FIG. 6 is an enlarged view of the encircled portion VI of FIG. 4.

Referring also to FIGS. 4–6, in assembly, the drive bracket 50 is placed in the cage 10. The first and second clasps 22, 32 of the cage 10 respectively enter the rectangular portions 582 of the first and second apertures 58, 78 of the drive bracket 50. The drive bracket 50 is slid downwardly, and the poles 226 of the first and second clasps 22, 32 enter the narrow portions 584 of the first and second apertures 58. The L-shaped tabs 220 of the first and second clasps 22, 32 abut the respective inclined portions 586 of the first and second apertures 58, 78. Simultaneously, the first and second domes. 24, 34 of the cage 10 respectively enter the first and second holes 62, 82 of the drive bracket 50 (see FIG. 5). The first and second recesses 26, 36 of the cage 10 respectively receive the first and second fixing tabs 66, 86 of the drive bracket 50. The first and second dimples 68, 88 of the respective first and second fixing tabs 66, 86 respectively enter the first and second bores 28, 38 of the cage 10 (see FIG. 6). Thus the drive bracket 50 is quickly and securely attached to the cage 10.

In alternative embodiments of the present invention, the first and second domes 24, 34 and first and second bores 28, 38 of the cage 10 are jointly or severally interchanged with the respective corresponding first and second holes 62, 82 and first and second dimples 68, 88 of the drive bracket 50.

In further alternative embodiments of the present invention, the engaging means of the present invention are configured at one end only of the computer enclosure, and the engaging means at the other end of the computer enclosure are conventional.

It is understood that the invention may be embodied in other forms without departing from the spirit thereof. Thus, the present example and embodiment are to be considered in all respects illustrative and not restrictive, and the invention is not to be limited to the details given herein.

I claim:

1. A computer enclosure comprising:
   a cage comprising a bottom panel and a first panel extending upwardly from an end of the bottom panel, the first panel having at least one first clasp, the at least one first clasp forming a tab with a pole extending away from the tab to an inner surface of the first panel; and
   a drive bracket comprising a base and two side walls extending upwardly from opposite sides of the base, at least one end of at least one side wall extending outwardly to form at least one first bent plate, the at least one first bent plate defining at least one first aperture therein for engaging with the at least one first clasp of the first panel.

2. The computer enclosure as described in claim 1, wherein the tab of the at least one first clasp is L-shaped and wherein the at least one first clasp has a slanted portion formed between the L-shaped tab and the pole.

3. The computer enclosure as described in claim 1, wherein, the at least one first aperture of the drive bracket comprises a wide portion and a narrow portion.

4. The computer enclosure as described in claim 3, wherein an inclined portion is defined between the wide portion and the narrow portion of the at least one first aperture.

5. The computer enclosure as described in claim 1, wherein the first panel defines a first opening in an upper portion thereof.

6. The computer enclosure as described in claim 5, wherein at least one first recess is formed at a lower edge of the first opening of the first panel, and wherein at least one first fixing tab depends from the base of the drive bracket for engaging with the at least one first recess.

7. The computer enclosure as described in claim 6, wherein at least one first bore is defined in the first panel at the at least one first recess, and wherein at least one first dimple is formed on the at least one first fixing tab of the drive bracket for engaging with the at least one first bore.

8. The computer enclosure as described in claim 1, wherein the first panel defines at least one first dome, and the at least one first bent plate of the drive bracket define at least one first hole therein for engaging with the at least one first dome.

9. The computer enclosure as described in claim 1, wherein:
   the cage further comprises a second panel extending upwardly from an opposite end of the bottom panel, the second panel forming at least one second clasp, the at least one second clasp forming an L-shaped tab with a pole extending away from the tab to an inner surface of the second panel; and
   the drive bracket further comprises at least one second bent plate extending outwardly from an opposite end of at least one side wall, the at least second bent plate defining at least one second aperture for engaging with the at least one second clasp of the second panel.

10. The computer enclosure as described in claim 9, wherein, the at least one second clasp has a slanted portion formed between the L-shaped tab and the pole.

11. The computer enclosure as described in claim 9, wherein the at least one second aperture of the drive bracket comprises a wide portion and a narrow portion.

12. The computer enclosure as described in claim 11, wherein an inclined portion is defined between the wide portion and the narrow portion of the at least one second aperture.

13. The computer enclosure as described in claim 9, wherein the second panel of the cage defines a second opening in an upper portion thereof.

14. The computer enclosure as described in claim 13, wherein at least one second recess is formed at a lower edge of the second opening of the second panel, and at least one second fixing tab depends from the base of the drive bracket for engaging with the at least one second recess.

15. The computer enclosure as described in claim 14, wherein at least one second bore is defined in the second panel at the at least one second recess, and wherein at least one second dimple is formed on the said at least one second fixing tab of the drive bracket for engaging with the at least one second bore.

16. The computer enclosure as described in claim 9, wherein the second panel defines at least one second dome, and the at least one second bent plate of the drive bracket defines at least one second hole therein for engaging with the at least one second dome.

17. A computer enclosure comprising:
   a cage comprising at least one upstanding panel;
   a clasp formed on the panel, said clasp including an L-shaped tab with a pole obliquely extending therefrom;
   a drive bracket including at least a side wall with a bent plate facing said panel; and
   an aperture defined in said bent plate; wherein
      said tab is wider than said pole, and said aperture defines a narrow portion and wider portion respectively in compliance with said pole and said tab whereby the clasp can approach the aperture with the tab facing the wider portion and with the pole facing the narrow portion, and then the bracket moves relative to the cage in a vertical direction to have the wider portion located below the tab and the narrow portion located between the tab and the panel.

* * * * *